United States Patent
Taylor et al.

(10) Patent No.: US 10,771,436 B2
(45) Date of Patent: Sep. 8, 2020

(54) DYNAMIC WHITELIST MANAGEMENT

(71) Applicant: Cisco Technology, Inc., San Jose, CA (US)

(72) Inventors: Robert Thomas Taylor, Morrisville, NC (US); M. David Hanes, Lewisville, NC (US); Nikhil Sainath Kale, Santa Clara, CA (US); Ana Perić, Hallbergmoos (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 146 days.

(21) Appl. No.: 15/946,907

(22) Filed: Apr. 6, 2018

(65) Prior Publication Data

US 2019/0312846 A1 Oct. 10, 2019

(51) Int. Cl.
*H04L 29/06* (2006.01)
*G06N 20/00* (2019.01)

(52) U.S. Cl.
CPC ........ *H04L 63/0281* (2013.01); *G06N 20/00* (2019.01); *H04L 63/0245* (2013.01); *H04L 63/1408* (2013.01)

(58) Field of Classification Search
CPC ............ H04L 63/0281; H04L 63/0245; H04L 63/1408; G06N 20/00
See application file for complete search history.

(56) References Cited

U.S. PATENT DOCUMENTS

| | | | |
|---|---|---|---|
| 9,047,441 B2 | 6/2015 | Xie et al. | |
| 9,148,407 B2* | 9/2015 | Martini | H04L 63/04 |
| 9,158,558 B1* | 10/2015 | Hernacki | G06F 9/445 |
| 9,626,359 B1* | 4/2017 | Sun | G06F 21/125 |
| 9,660,998 B1 | 5/2017 | Sethi | |
| 10,231,120 B2* | 3/2019 | Nethi | H04W 12/02 |
| 2008/0114990 A1* | 5/2008 | Hilbert | G06F 12/1458 713/189 |
| 2011/0162076 A1* | 6/2011 | Song | G06F 21/554 726/26 |
| 2013/0047255 A1* | 2/2013 | Dalcher | H04L 63/20 726/23 |
| 2013/0276112 A1* | 10/2013 | Dalcher | H04L 63/1425 726/23 |
| 2014/0096194 A1* | 4/2014 | Bhogavilli | H04L 63/0236 726/3 |

(Continued)

OTHER PUBLICATIONS

PaloAlto Networks, "PAN-OS® Administrator's Guide," Version 6.1, Nov. 7, 2017, retrieved from https://www.paloaltonetworks.com/documentation/61/pan-os/pan-os, 76 pages.

(Continued)

*Primary Examiner* — Ghodrat Jamshidi (74) *Attorney, Agent, or Firm* — Edell, Shapiro & Finnan, LLC (57) ABSTRACT

In one example embodiment, a proxy for a network obtains a traffic flow. The proxy determines whether a security policy in a whitelist for the traffic flow is active. If it is determined that the security policy for the traffic flow is active, the proxy selectively decrypts the traffic flow to produce one or more traffic flow attributes and, based on the one or more traffic flow attributes, determines whether the traffic flow is potentially malicious.

20 Claims, 5 Drawing Sheets

(56) References Cited

U.S. PATENT DOCUMENTS

| | | | |
|---|---|---|---|
| 2014/0259093 A1* | 9/2014 | Narayanaswamy | H04L 47/20 726/1 |
| 2015/0058987 A1* | 2/2015 | Thure | G06F 21/565 726/23 |
| 2016/0234232 A1* | 8/2016 | Poder | H04L 63/1416 |
| 2016/0359686 A1* | 12/2016 | Parandehgheibi | H04J 3/14 |
| 2017/0223054 A1 | 8/2017 | Wing et al. | |
| 2017/0244713 A1* | 8/2017 | Sun | G06F 21/125 |
| 2017/0331780 A1* | 11/2017 | Reddy | H04L 61/6013 |
| 2018/0139142 A1* | 5/2018 | Chhabra | H04L 47/2441 |
| 2018/0365420 A1* | 12/2018 | Krylov | H04L 63/1408 |
| 2019/0281052 A1* | 9/2019 | Lekkas | H04L 63/20 |

OTHER PUBLICATIONS

Cimpanu, "Malware Group Uses Facebook CDN to Bypass Security Solutions," Sep. 9, 2017, retrieved from https://www.bleepingcomputer.com/news/security/malware-group-uses-facebook-cdn-to-bypass-security-solutions/, 6 pages.

Wallarm, "How it Works," https://wallarm.com/how-it-works/, retrieved Jan. 17, 2018, 18 pages.

Deign, "Seeing Threats Hidden in Encrypted Traffic," The Network—Cisco's Technology News Site, Jun. 20, 2017, retrieved from https://newsroom.cisco.com/feature-content?type=webcontent&articleId=1853370, 4 pages.

Valeros et al., "Cognitive Threat Analytics: Turn Your Proxy Into Security Device," Sep. 19, 2016, retrieved from https://blogs.cisco.com/security/cognitive-threat-analytics-turn-your-proxy-into-security-device, 6 pages.

* cited by examiner

DYNAMIC WHITELIST MANAGEMENT

TECHNICAL FIELD

The present disclosure relates to computer network security.

BACKGROUND

Secure web gateways, or "proxies," have been heavily adopted in recent years as organizations have fought to defend against malware and attacks originating through website traffic. Such proxies can decrypt outbound encrypted (e.g., via Hypertext Transfer Protocol Secure (HTTPS)) traffic to determine whether the traffic could prompt a malicious event. For example, the proxy may determine whether outbound encrypted traffic will initiate communication with a bad actor.

However, it is estimated that encrypted network traffic grows about 90% every year. Over 50% of websites encrypted traffic in 2017, compared to just 31% in 2016. It is further estimated that 80% of traffic will be encrypted by 2019. Since proxies today are heavily Central Processing Unit (CPU) resource dependent, and as such were not purpose built to handle large amounts of encrypted traffic, proxies have struggled to handle increasing volumes of encrypted traffic. This is because proxies often need to decrypt encrypted traffic in order to determine whether the traffic could cause a malicious event. The compute resources needed to decrypt/encrypt payloads will continue to increase exponentially as the industry moves to 2048 bit keys.

As such, many organizations implement whitelists. Whitelists identify specific outbound web traffic that is permitted to bypass proxy inspection. Such traffic would otherwise be deeply inspected (e.g., decrypted and examined) by a proxy. Administrators use whitelists for many reasons, such as managing system resources, incompatibility of services, privacy requirements, and high volume trusted connections.

DESCRIPTION OF EXAMPLE EMBODIMENTS

Overview

In one example embodiment, a proxy for a network obtains a traffic flow. The proxy determines whether a security policy in a whitelist for the traffic flow is active. If it is determined that the security policy for the traffic flow is active, the proxy selectively decrypts the traffic flow to produce one or more traffic flow attributes and, based on the one or more traffic flow attributes, determines whether the traffic flow is potentially malicious.

Example Embodiments

Figure 1:
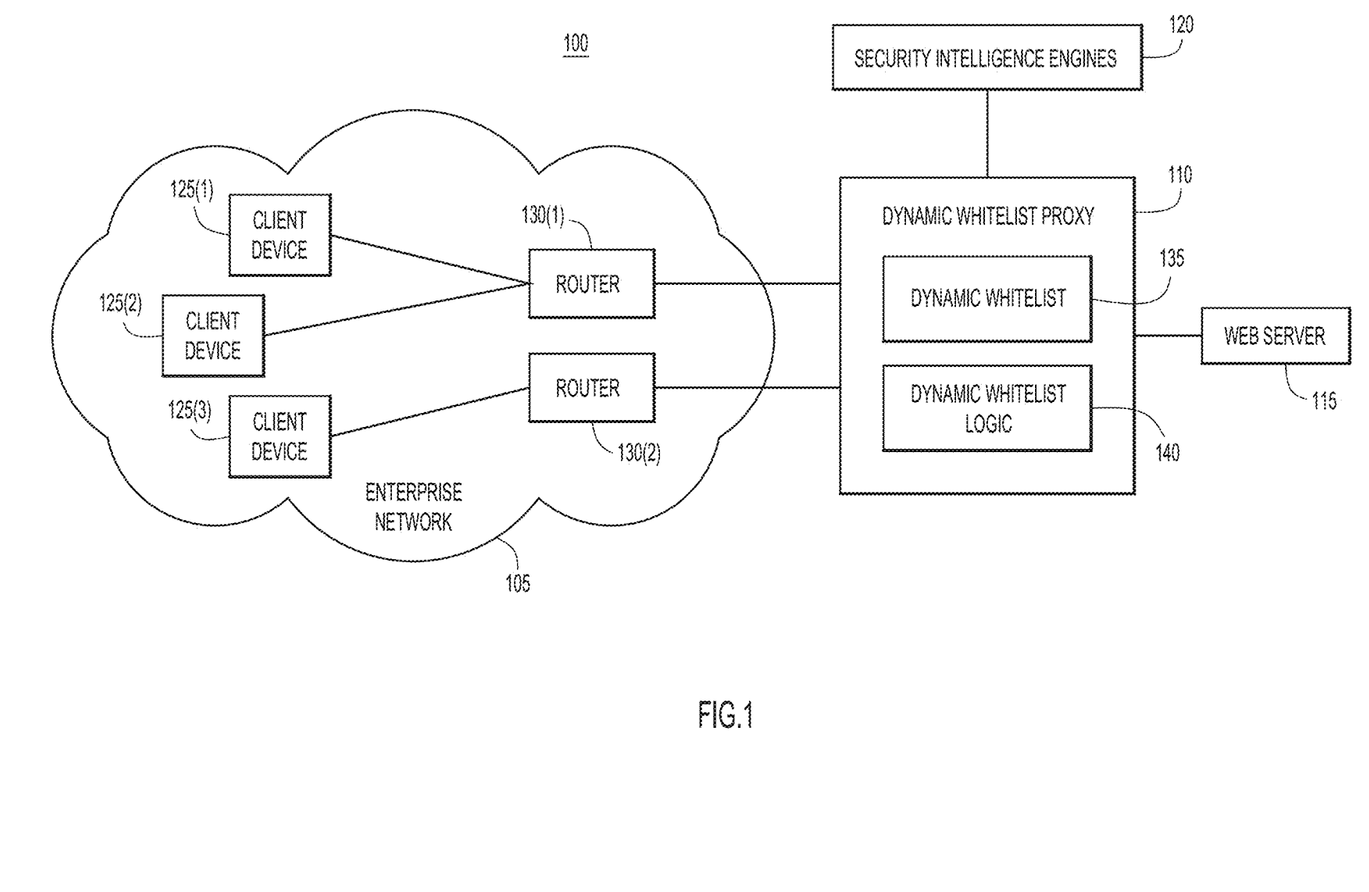
FIG. 1 is a block diagram of a network environment including a dynamic whitelist proxy configured for dynamic whitelist management, according to an example embodiment.

Referring first to FIG. 1, a network environment 100 is shown. The network environment 100 is configured for dynamic whitelist management in accordance with examples presented herein. The network environment 100 includes an enterprise network 105, a dynamic whitelist proxy 110, and a web server 115. It should be understood that many more web servers may be present, hut for simplicity in describing the embodiments, a single web server 115 is shown. The network environment 100 may also optionally include security intelligence engines 120 that perform network security analysis and provide updates to the dynamic whitelist proxy 110.

The enterprise network 105 includes client devices 125(1)-125(3) and routers 130(1)-130(2). This is a highly simplified representation of enterprise network 105 and it should be understood that there may be more client devices, networking devices, and other elements in enterprise network 105.

The dynamic whitelist proxy 110 includes a dynamic whitelist 135 and dynamic whitelist logic 140 to manage the dynamic whitelist 135. In one example, the dynamic whitelist proxy 110 is located on the edge of the enterprise network 105.

Client devices 125(1)-125(3) send, via routers 130(1)-130(2), one or more (encrypted) outbound network traffic flows that are destined for web server 115. The web server 115 may be accessible via the Internet. The dynamic whitelist proxy 110 intercepts/receives/obtains the outbound network traffic flow(s) and, based on the dynamic whitelist 135, determines whether a traffic flow is potentially malicious.

Conventional proxies have difficulty handling the increasing volume of encrypted network traffic. Consequently, many organizations/enterprises are implementing whitelists to avoid forcing proxies to decrypt and inspect each intercepted network packet. However, these whitelists are typically static, meaning that enterprises naively place hard-coded lists of Internet Protocol (IP) addresses into "bypass" policies. This ultimately leaves the enterprise network open to web attacks through the statically whitelisted traffic, because such traffic is not decrypted. In other words, statically whitelisted traffic is allowed regardless of the potential security ramifications of permitting the traffic to proceed to its destination. As used herein, "whitelisted traffic" and similar terms refer to network traffic that is subject to security policies of a whitelist.

As an example, many network administrators whitelist traffic destined for websites operated by major companies that are common HTTPS destinations, as such websites are often assumed to be trusted. However, it has been determined that a malware group stored malicious files in at least one well-known service's Content Delivery Network (CDN). Users were tricked into accessing and downloading these files through a "trusted" website operated by a trusted service. Many of the users were only permitted to download those malicious files because outgoing traffic to that "trusted" website was statically whitelisted by virtue of the website's affiliation with the service.

In such situations, users are unknowingly exposed to security risks, and depend on the company operating the destination website to rapidly resolve the issue. Moreover, resolution can take days or even weeks. Meanwhile, the user/enterprise network is left exposed unless the network administrator manually edits the static whitelist by removing the unsafe destination website.

A static whitelist enables traffic to bypass a proxy without examination of any properties of the traffic other than very basic unencrypted parameters. As illustrated by the above example, this is highly dangerous, and risks exposure to attacks and other threats. As the amount of encrypted traffic continues to grow, static whitelisting is predicted to be relied upon increasingly. As such, if this trend of using static whitelists continues, networks/users will be exposed to security vulnerabilities in increasing number and scale.

Accordingly, techniques are presented herein to enable management of a dynamic whitelist. As explained in greater detail below, the dynamic whitelist proxy 110 dynamically configures dynamic whitelist 135 for enterprise network 105. The dynamic whitelist proxy 110 may determine whether a security policy in the dynamic whitelist 135 for an outbound traffic flow is active and, if it is determined that the security policy is active, selectively decrypt the outbound traffic flow to produce one or more outbound traffic flow attributes. Based on the one or more outbound traffic flow attributes, the dynamic whitelist proxy 110 may determine whether the outbound traffic flow is potentially malicious.

In response to determining that the outbound traffic flow is potentially malicious, the dynamic whitelist proxy 110 may, for example, deactivate the security policy for the outbound traffic flow, thereby causing the dynamic whitelist proxy 110 to decrypt and inspect any similar future traffic flows. The dynamic whitelist proxy 110 may also/alternatively quarantine, or perform a three full analysis on, the outbound traffic flow.

The dynamic whitelist proxy 110 may selectively decrypt (e.g., sample) the outbound traffic flow in order to determine whether to change/update the dynamic whitelist 135. Because decryption is "selective," such decryption is not performed for each packet in a flow. Instead, a reasonable number of packets in a single flow is determined such that the decryption does not impact performance of the dynamic whitelist proxy 110, while nonetheless offering a meaningful number to extrapolate and predict behaviors of similar flows in the future. Thus, the dynamic whitelist proxy 110 may send, to web server 115, both whitelisted outbound network traffic that has not been decrypted, and also whitelisted outbound network traffic that has been selectively decrypted.

In one example of selective decryption, the dynamic whitelist proxy 110 performs selective decryption randomly or periodically. For example, an administrator of network 105 may instruct the dynamic whitelist proxy 110 to perform one full decryption for packets destined for a given destination every five minutes. In one example, the frequency for selective decryption may be chosen based on the frequency with which the dynamic whitelist proxy 110 receives updates from the security intelligence engines 120. For example, the network administrator may select the five minute period because the dynamic whitelist proxy 110 receives updates from the security intelligence engines 120 every five minutes. The network administrator may instruct the dynamic whitelist proxy 110 to perform selective decryption based on time (e.g., periodically) or truly randomly. The security intelligence engines 120 are described in greater detail below, in connection with FIG. 2.

In another example, the dynamic whitelist proxy 110 also/alternatively performs selective decryption based on a machine learning process. The machine learning process may react to anomalous events, such as a change in outbound traffic flow attributes, to temporarily perform full decryption on that traffic flow until the confidence level that the traffic flow is not malicious increases beyond some threshold. For example, if the traffic flow to a given destination is typically five packets per minute, but there is suddenly a spike in traffic to that destination, the dynamic whitelist proxy 110 may determine that it is possible that the network 105 has been hijacked/hacked/etc. As such, the dynamic whitelist proxy 110 may make an intelligent decision to selectively perform a full decryption of at least one of the packets in the flow.

The machine learning process may use full decryption and inspection of whitelisted traffic to monitor certain dynamic network traffic parameters and determine whether a sudden increase in a network traffic flow is malicious. For example, in addition to IP/domain/certificate information, the machine learning process may also verify that anomalous whitelisted flows are free of malware, and are consistent with previous results for the whitelisted flow. This may involve a deeper inspection of a downloaded file by a malware protection system, dynamic analysis of Hypertext Markup Language (HTML) content, reputation score/category results, etc. The dynamic whitelist proxy 110 may thereby use intelligent checkpoints to perform occasional deep inspection, randomly and/or at times the machine learning process determines (e.g., during a spike in traffic for that network flow).

The dynamic whitelist proxy 110 may produce one or more outbound traffic flow attributes based on the selective decryption. The dynamic whitelist proxy 110 may use the one or more outbound traffic flow attributes to train a machine learning process for determining whether future traffic flows are potentially malicious.

The following are examples of attributes which may be collected from the selectively decrypted packets:
Protocol
Source/destination IPv4/IPv6 address
Source/destination port
Domain Name System (DNS) parameters (e.g., Time-to-Live (TTL), IP data, etc.)
HTTP (and decrypted HTTPS) request headers
HTTP (and decrypted HTTPS) response headers
Transport Layer Security (TLS) values for each unencrypted HTTPS flow, including:
    Client/server hello parameters (e.g., offered cipher suite, negotiated cipher suite, protocol version, etc.)
    Extracted server certificate data (e.g., Common Name (CN), Server Name Indication (SNI), signature, expiration/extensions, data in potential chain using certificate chasing, etc.)
First few bytes of the body of the packet The dynamic whitelist proxy 110 may also/alternatively collect traffic flow statistics/information (e.g., unencrypted pieces of the packet header). Examples of such traffic flow statistics include rate of flow, frequency of flow, number of users using the whitelisted destination, length of the packets, delay between the packets in the same flow, arrival timestamps, etc. These statistics may be collected/cached in a local database (not shown) on the dynamic whitelist proxy 110 and analyzed. If the dynamic whitelist proxy 110 determines that the traffic should not be whitelisted based on these traffic flow statistics, that traffic may be removed from the whitelist. The dynamic whitelist proxy 110 may thus use statistics to create a history of parameters that inform future actions of the dynamic whitelist proxy 110.

A machine learning process may be trained based on one or more outbound traffic flow attributes to determine whether future traffic flows are potentially malicious. A subset of extracted data may be from whitelisted traffic, and another subset of extracted data may be from regular (non-whitelisted) traffic. The machine learning process may train based on known "truths" for the training data (e.g., that a whitelisted traffic flow is not malicious). Therefore, the machine learning process may be of a supervised learning type. The machine learning process may be sufficiently flexible to include or exclude any relevant flow parameters. The machine learning process may also train based on input received from the security intelligence engines 120. Thus, the machine learning process may complement existing security mechanisms (e.g., security intelligence engines 120). Based on these inputs/attributes, the machine learning process may return a measure (e.g., percentage) of certainty that the outbound traffic flow is malicious.

The machine learning process may also obtain additional flow insights, and detect traffic pattern anomalies, to determine whether a flow is deviating from its expected behavior. Once an anomaly is detected, the dynamic whitelist proxy 110 may enforce specific flow actions to be taken on the flow, and/or perform further analysis on the flow. For HTTPS flows, this may involve further decryption to learn more about the suspicious flows and further contribute to the machine learning model. In one example, using traffic flow attributes, the machine learning process may detect anomalies in relevant traffic parameters (e.g., traffic rate, pattern, protocols, secure algorithms, ciphers, packet distribution, certificate fields, etc.). Alternatively/additionally, the collected traffic flow attributes may be sent to one or more of security intelligence engines 120 for further analysis.

The security intelligence engines 120 shown in FIG. 1 are now described in more detail. The security intelligence engines 120 may be a collection of one or more network security systems (e.g., encrypted traffic analyzer, classifiers, and other security databases in the cloud) that communicate with dynamic whitelist proxy 110 regarding security information. The communication may be bi-directional, with dynamic whitelist proxy 110 and security intelligence engines 120 providing updates to each other. For example, the dynamic whitelist proxy 110 may update/add information to security intelligence engines 120.

In one example, one of the security intelligence engines 120 (e.g., an encrypted traffic analyzer) may send a suspicious signature of a traffic flow to the dynamic whitelist proxy 110. The dynamic whitelist proxy 110 may perform an analysis of the traffic flow and report back the results (e.g., that the flow is in fact harmless). Thus, the dynamic whitelist proxy 110 may gain a better understanding of whether encrypted flows are malicious based on the security intelligence engines 120, and may also act as a sensor by sending learned information back to the security intelligence engines 120. In another example, the dynamic whitelist proxy 110 may update dynamic whitelist 135 based on input from the security intelligence engines 120 (e.g., that a particular flow is malicious).

Figure 2:
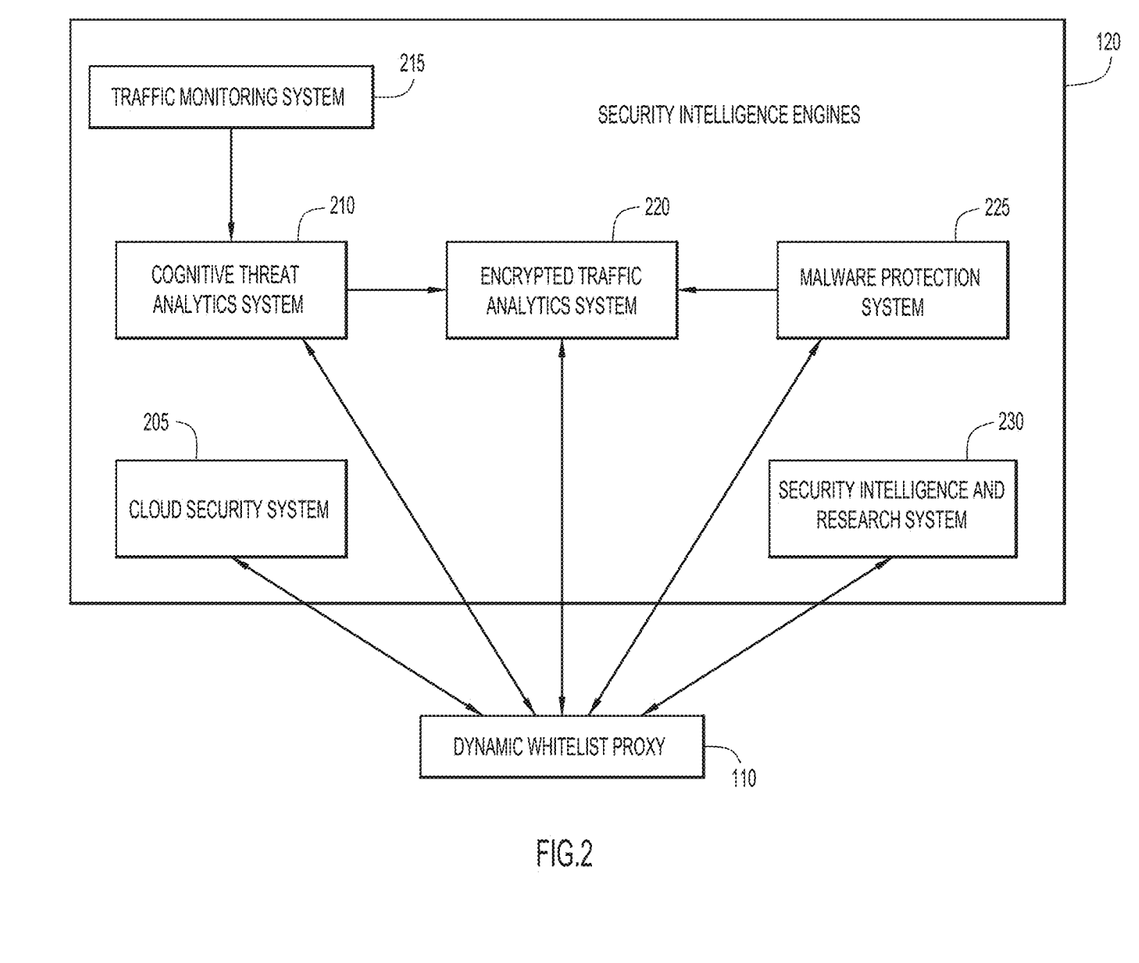
FIG. 2 is a diagrammatic illustration of an ecosystem of security intelligence engines with which the dynamic whitelist proxy may communicate, according to an example embodiment.

Turning now to FIG. 2, an example collection of external security intelligence engines 120 is shown. The security intelligence engines 120 may include a cloud security system 205, a cognitive threat analytics system 210, a traffic monitoring system 215, an encrypted traffic analytics system 220, a malware protection system 225, and a security intelligence and research system 230. The dynamic whitelist proxy 110 may communicate bidirectionally with one or more of security intelligence engines 120, including cloud security system 205, cognitive threat analytics system 210, encrypted traffic analytics system 220, malware protection system 225, and security intelligence and research system 230.

The dynamic whitelist proxy 110 may communicate with cloud security system 205, encrypted traffic analytics system 220, and security intelligence and research system 230 via respective Application Programming Interfaces (APIs). Traffic monitoring system 215 may communicate security information to cognitive threat analytics system 210. Cognitive threat analytics system 210 and/or malware protection system 225 may communicate security information to encrypted traffic analytics system 220.

In one specific example, the encrypted traffic analytics system 220 may provide traffic flow classifiers and signatures to the dynamic whitelist proxy 110 in real-time. Based on matches with this data, the dynamic whitelist proxy 110 may place specified whitelist traffic flows into a block list, enforce a full decryption policy (temporarily or permanently), or continue whitelisting with cached results from the encrypted traffic analytics system 220. As new anomalies are discovered (e.g., based on the machine learning process) by comparing all learned and known parameters with traffic information, the dynamic whitelist proxy 110 may report its findings back to the encrypted traffic analytics system 220. Thus, data may be sent back to security intelligence engines 120.

The aforementioned scenario about the content service may have been avoided using the techniques presented herein. The dynamic whitelist proxy 110 may have monitored outbound traffic flows (e.g., from client devices 125(1)-125(3)) destined for domains associated with the service (e.g., destined for web server 115). For example, the dynamic whitelist proxy 110 may have automatically removed network traffic from dynamic whitelist 135, or generated a notification suggestion for the network administrator to manually remove such traffic from the whitelist. The dynamic whitelist proxy 110 may have performed these operations based on a notification from one or more security intelligence engines that network traffic destined for certain service destinations, such as web server 115, is potentially malicious.

As such, the dynamic whitelist proxy 110 may have checked the outbound traffic flows against known security data (e.g., from the security intelligence engines 120), and temporarily decrypted/secured such traffic until the service had blocked the malicious abuse of their CDN. For example, the dynamic whitelist proxy 110 may have blocked such traffic until the service had resolved the issue. The dynamic whitelist proxy 110 may then have received an update from the security intelligence engines 120, and automatically restored the network traffic destined for web server 115 back to its original whitelisted state. The dynamic whitelist proxy 110 may have alternatively provided a notification/suggestion for the network administrator to manually add such traffic back to the whitelist.

Thus, the dynamic whitelist proxy 110 may share knowledge obtained by the machine learning process with a network administrator. For example, the dynamic whitelist proxy 110 may provide an indication that a certain type of traffic should be whitelisted. The dynamic whitelist proxy 110 may enforce unsupervised policy actions (e.g., automatically temporarily blocking/dropping flows) for any flows that the dynamic whitelist proxy 110 determines to be suspicious. Moreover, a fully configurable feedback loop may allow a network administrator to choose the appropriate actions by, for example, prompting the network administrator to follow certain suggestions (e.g., suggestions to exclude certain suspicious Uniform Resource Locators (URLs) from being whitelisted). The network administrator and the dynamic whitelist proxy 110 may communicate with each other using, for example, a Graphical User Interface (GUI) or Command Line interface (CLI). The network administrator may use a GUI/CLI to instruct the dynamic whitelist proxy 110 to remove a suspicious URL from the dynamic whitelist 135, or to grant the dynamic whitelist proxy 110 permission to automatically add/remove network flows to/from the dynamic whitelist 135.

The dynamic whitelist proxy 110 may manage (e.g., maintain, create, configure, control, prompt the network administrator to modify, etc.) the dynamic whitelist 135. The dynamic whitelist proxy 110 may integrate known, common, and secure whitelist destinations (e.g., manually set by the network administrator) with those automatically determined by the dynamic whitelist proxy 110. In one example, the dynamic whitelist proxy 110 may identify top destinations for enterprise network 105, which are currently being whitelisted securely (e.g., with a high confidence score). The network administrator may receive a suggestion from the dynamic whitelist proxy 110 designed to improve processing capacity while maintaining strong security policies. If allowed by the network administrator, the dynamic white list proxy 110 may add network traffic to dynamic whitelist 135. For example, if there is a large amount of encrypted network traffic destined for web server 115, and the dynamic whitelist proxy 110 is currently decrypting every packet, the dynamic whitelist proxy 110 may whitelist that traffic in order to improve performance (e.g., reduce network congestion).

Figure 3:
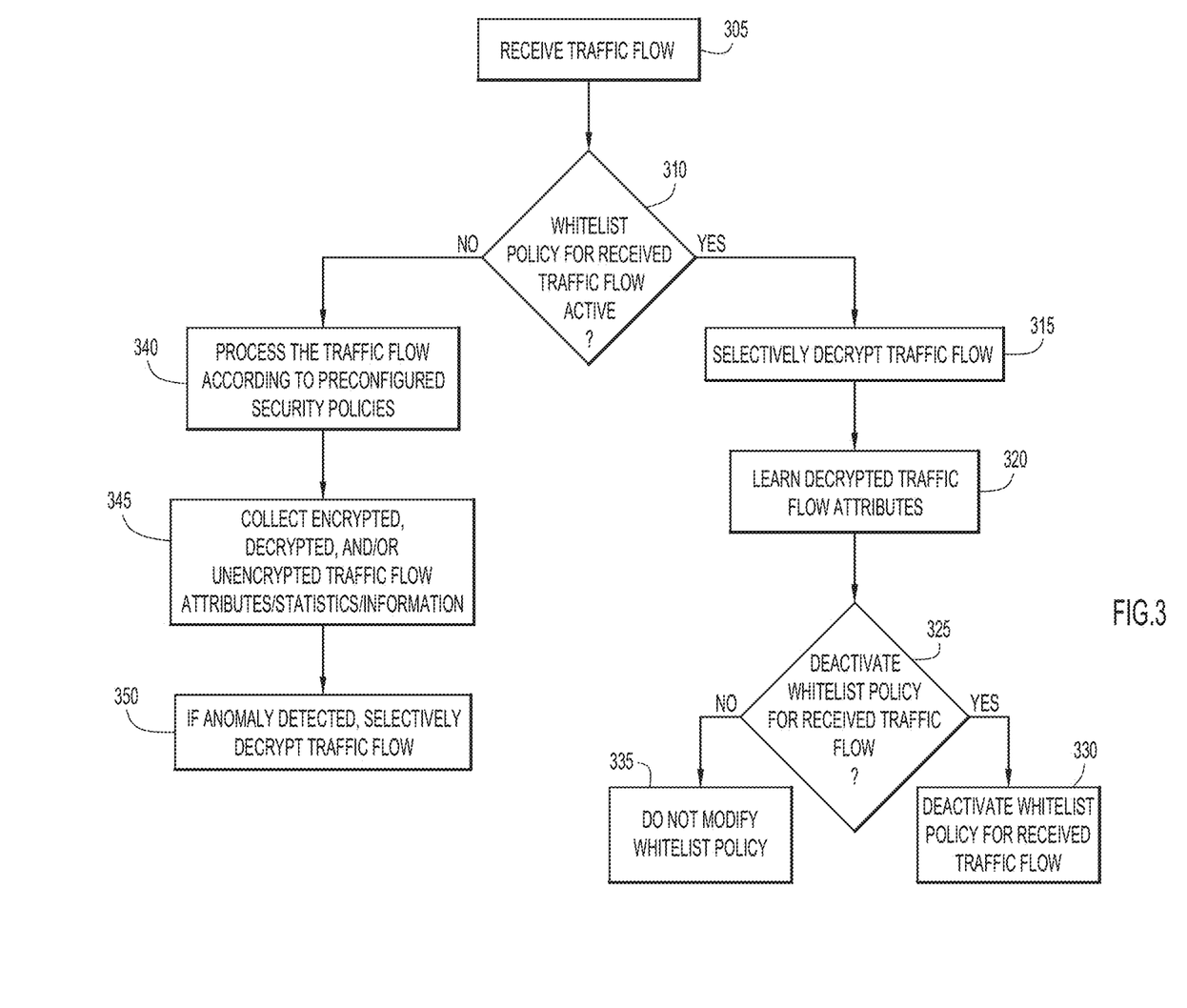
FIG. 3 is a flowchart of a method for dynamic whitelist management, according to an example embodiment.

Turning now to FIG. 3, a flowchart is shown of a method for dynamic whitelist management, according to an example embodiment. The dynamic whitelist proxy 110 shown in FIGS. 1 and 2 may perform the operations illustrated in FIG. 3. At 305, the dynamic whitelist proxy obtains/receives a traffic flow (e.g., an outbound traffic flow). At 310, the dynamic whitelist proxy determines whether a whitelist policy for the received traffic flow is active (e.g., whether the dynamic whitelist 135 includes security policies permitting the received traffic flow to bypass decryption/deep inspection at the dynamic whitelist proxy). If so ("yes"), the dynamic whitelist proxy selectively decrypts the received traffic flow at 315. At 320, the dynamic whitelist proxy learns decrypted traffic flow attributes of the received traffic flow.

At 325, the dynamic whitelist proxy determines whether to deactivate the whitelist policy for the received traffic flow (e.g., based on the decrypted traffic flow attributes). Determining whether to deactivate a whitelist policy may include a determination of whether the received traffic flow is potentially malicious. If so ("yes"), at 330, the dynamic whitelist proxy deactivates the whitelist policy for the received traffic flow. Otherwise ("no"), at 335, the dynamic whitelist proxy does not modify the whitelist policy.

Returning to 310, the dynamic whitelist proxy may determine that the whitelist policy for the received traffic flow is not active ("no"). In this case, at 340, the dynamic whitelist proxy processes the traffic flow according to preconfigured security policies (e.g., according to a policy engine of the dynamic whitelist proxy). As shown at 345 and 350, the dynamic whitelist proxy may monitor the traffic flow for anomalies to determine whether to selectively decrypt the traffic flow. At 345, the dynamic whitelist proxy collects encrypted, decrypted, and/or unencrypted traffic flow attributes/statistics/information. At 350, if an anomaly is detected, the dynamic whitelist proxy may selectively decrypt the traffic flow. The results of the selective decryption may, for example, be reported to a network administrator.

Figure 4:
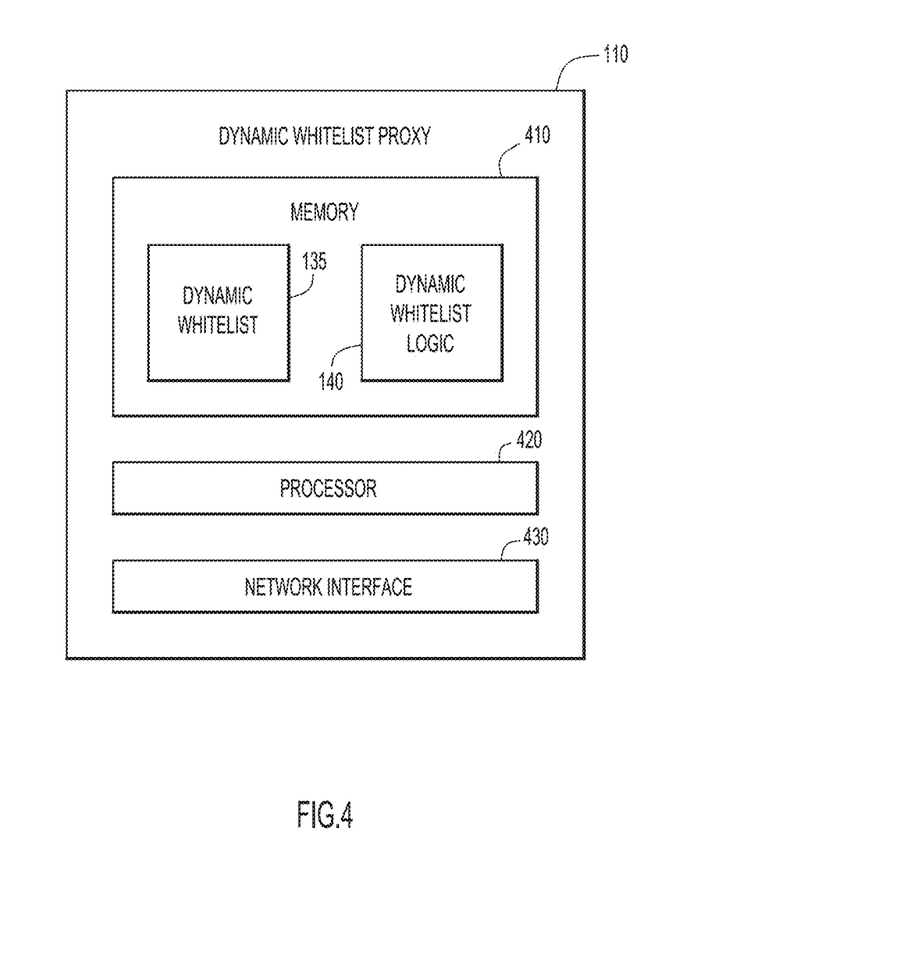
FIG. 4 is a block diagram of the dynamic whitelist proxy of FIG. 1, according to an example embodiment.

FIG. 4 is a simplified block diagram of dynamic whitelist proxy 110 configured to implement the techniques presented herein. In this example, the dynamic whitelist proxy 110 includes a memory 410 that stores the dynamic whitelist 135 and instructions for dynamic whitelist logic 140, one or more processors 420, and a network interface 430. The one or more processors 420 are configured to execute instructions stored in the memory 410 for the dynamic whitelist logic 140. When executed by the one or more processors 420, the dynamic whitelist logic 140 causes the dynamic whitelist proxy 110 to perform operations described herein. The network interface 430 is a network interface card (or multiple instances of such a device) or other network interface device that enables network communications on behalf of the dynamic whitelist proxy 110 for sending and receiving messages (e.g., network flows) as described above.

The memory 410 may be read only memory (ROM), random access memory (RAM), magnetic disk storage media devices, optical storage media devices, flash memory devices, electrical, optical, or other physical/tangible memory storage devices. Thus, in general, the memory 410 may be one or more tangible (non-transitory) computer readable storage media (e.g., a memory device) encoded with software comprising computer executable instructions and when the software is executed (by the processor 420) it is operable to perform the operations described herein.

Figure 5:
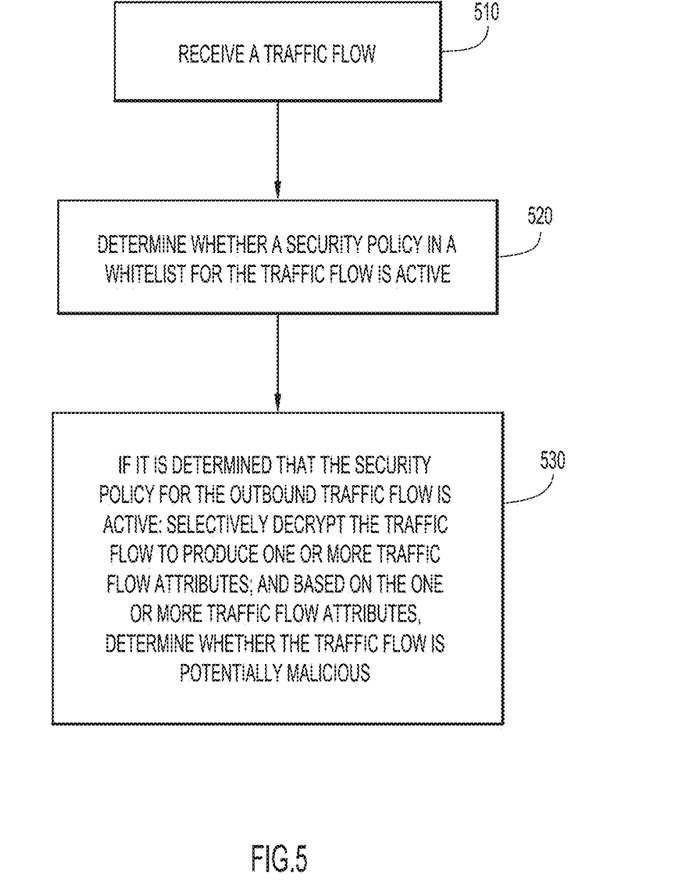
FIG. 5 is a flowchart of another method for dynamic whitelist management, according to an example embodiment.

FIG. 5 is a flowchart of a method for dynamic whitelist management according to the embodiments presented herein. This method may be performed at a proxy for a network (e.g., dynamic whitelist proxy 110). At 510, the proxy obtains/receives a traffic flow. At 520, the proxy determines whether a security policy in a whitelist for the traffic flow is active. At 530, if it is determined that the security policy for the traffic flow is active: the proxy selectively decrypts the traffic flow to produce one or more traffic flow attributes; and based on the one or more traffic flow attributes, determines whether the traffic flow is potentially malicious.

As the proxy decrypts/inspects/encrypts HTTPS sessions, it learns a great deal about the traffic patterns and security architecture of the network. For example, the proxy may associate a Secure Sockets Layer (SSL) session handshake, and its key parameters, with the unencrypted data discovered after decrypting the packet (and its associated HTTP request). This may reveal a meshed web of information about user traffic patterns. A machine learning process (e.g., a machine learning enabled engine) on the proxy may correlate this information over time, and compare this information against proprietary security trust information in the cloud (and/or on the proxy). The proxy may assess the trusted nature of the end host that the user is trying to reach as well as of the user itself (in case either is compromised). Machine learning adds another dimension of analysis for examining traffic trends, common destinations versus anomalous connections, and other packet attributes to ensure normal behavior. These capabilities may be utilized to make existing whitelist configurations more secure, and may thus be desirable for network/security administrators who are concerned enough about security to avoid using a whitelist, as well as for those who naively whitelist high-volume traffic. These mechanisms may minimize the security risk of decisions made solely by a network administrator.

Typically, the top HTTPS traffic destinations are known, trusted, and valuable destinations/sites for users, but take up valuable resources for proxies to decrypt. A dynamic whitelist proxy (assisted by, advanced machine learning and proprietary data) may reduce network load/impact caused by HTTPS traffic, provide a better end user experience, and more securely whitelist these sites.

As described herein, a dynamic whitelist proxy may examine traffic originating from a presumed trusted/secured environment outbound to an unknown/untrusted one. This applies to HTTP/HTTPS traffic, but also to network traffic (e.g., web traffic) in general. The dynamic whitelist proxy may utilize existing encrypted payload information and network collected data to make whitelist conditions dynamic, and add various aspects of shared security information to the creation and maintenance of these lists. The dynamic whitelist proxy may add significant efficacy to current security practices, save capital expenses/energy of user equipment, and complement an ecosystem of encrypted traffic knowledge that benefits the entire security architecture.

The dynamic whitelist proxy may examine outbound requests/connections that might be sourced by malware. For example, malware might have previously entered the network, or a user might be attempting to connect to a site known to host malware or other security threats. The dynamic whitelist proxy may train a machine learning process to reduce CPU processing and intelligently maintain a secure bypass list (dynamic whitelist) for trusted HTTPS connections, thereby simplifying network management, reducing cost, and enhancing existing (non-secure) security practices.

As described herein, a web proxy (e.g., dynamic whitelist proxy 110) may dynamically monitor and adjust a whitelist of HTTPS traffic on a web proxy in a continuous real-time manner. Furthermore, the web proxy may be partial to (e.g., focus on protecting a network from) whitelisted, non-secured traffic, and may use a machine learning process to control actions taken on the whitelist. For example, the web proxy may act based on anomalous traffic rates, flow parameters, and selective decryption results cached locally at the web proxy. Whitelisted traffic is not typically/conventionally exposed to such scrutiny. These techniques obviate to need to wait for the destination website to resolve the issue and, in many cases, may resolve the threat in minutes. The web proxy may resolve the threat by, for example, dynamically changing the whitelist and forcing all traffic destined to these compromised domains to be decrypted and checked, until the web proxy confirms that the destination site has implemented the necessary security fix. The web proxy may then automatically add the destination site back to the dynamic whitelist to ease the processing burden on the web proxy.

In one example, the web proxy, may generate a local trust/confidence assessment score of an existing whitelisted flow. One parameter that could influence that score may be the result of a source external to the web proxy (e.g., one of the security intelligence engines 120). The network flows may be source/destination/domain flows (information available in the unencrypted header), and the web proxy may take action on an internal host, an external network, or both. If the network administrator grants control of the whitelist policy to the web proxy, the web proxy may inject/write new policies to control/edit the dynamic whitelist. The web proxy may thus enhance security for a whitelist that users are choosing to implement.

According to the embodiments disclosed herein, dynamic continuous whitelist monitoring is provided which controls when a resource constrained proxy should decrypt whitelisted network traffic. This offers a major cost and resource benefit to users who conventionally must choose between whitelisting flows in a static bypass manner or dealing with performance issues due to decrypting every single HTTPS flow. In one example, this whitelist monitoring combines three features for making whitelist traffic more secure through dynamic, real-time, continuous whitelist monitoring and maintenance. These features are: (1) continuous, dynamic whitelist monitoring; (2) an adaptive machine learning based training model; and (3) proxy-as-a-sensor functionality.

Continuous dynamic whitelist monitoring involves examining whitelisted traffic flows and data attributes related to those flows, in order to potentially take dynamic whitelist action on such flows. The adaptive machine learning-based training model may be leveraged to power this monitoring/detection. The web proxy may selectively use full decryption/inspection (randomly and/or on-demand based on a machine-learning process) to verify that the traffic flows are indeed secure, and to train the machine learning process using additional flow parameters detected during full inspection. This allows the model to better adapt and make decisions regarding when to decrypt traffic, which results in a higher throughput as well as conservation of on-box (system) resources.

With respect to proxy-as-a-sensor functionality, the web proxy may bidirectionally communicate with encrypted traffic signatures and/or classifiers from the cloud. This may help the web proxy gain a better understanding of whether encrypted flows are malicious. The web proxy may also share learned information with the security intelligence engines, thereby acting as a sensor with respect to the security intelligence engines.

Moreover, dynamic real-time mechanisms are provided for monitoring, securing, and controlling whitelists by a web proxy (e.g., dynamic whitelist proxy 110). The web proxy may determine which whitelisted flows to decrypt (or not to decrypt). The web proxy may perform a live analysis of unencrypted and encrypted flow parameters to determine any anomalous traffic patterns. Available cloud intelligence combined with machine learning may provide backend intelligence. This saves enterprise network owners time, resources, and cost, and provides an alternative choice to insecurely bypassing traffic using static whitelists or dealing with the performance issues that often arise from decrypting every HTTPS flow.

In one form, a method is provided. The method comprises: at a proxy for a network: obtaining a traffic flow; determining whether a security policy in a whitelist for the traffic flow is active; and if it is determined that the security policy for the traffic flow is active: selectively decrypting the traffic flow to produce one or more traffic flow attributes; and based on the one or more traffic flow attributes, determining whether the traffic flow is potentially malicious.

In another form, an apparatus is provided. The apparatus comprises: a memory that stores whitelist data for a whitelist; a network interface that enables network communication; and one or more processors coupled to the memory and the network interface, wherein the one or more processors are configured to: obtain a traffic flow; determine whether a security policy in a whitelist for the traffic flow is active; and if it is determined that the security policy for the traffic flow is active: selectively decrypt the traffic flow to produce one or more traffic flow attributes; and based on the one or more traffic flow attributes, determine whether the traffic flow is potentially malicious.

In another form, one or more non-transitory computer readable storage media are provided. The non-transitory computer readable storage media are encoded with instructions that, when executed by a processor, cause the processor to: obtain a traffic flow; determine whether a security policy in a whitelist for the traffic flow is active; and if it is determined that the security policy for the traffic flow is active: selectively decrypt the traffic flow to produce one or more traffic flow attributes; and based on the one or more traffic flow attributes, determine whether the traffic flow is potentially malicious.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a proxy for a network:
obtaining a traffic flow;
determining whether a security policy in a whitelist for the traffic flow is active; and
if it is determined that the security policy for the traffic flow is active:
selectively decrypting the traffic flow to produce one or more traffic flow attributes;
based on the one or more traffic flow attributes, determining whether the traffic flow is potentially malicious;
in response to determining that the traffic flow is potentially malicious, deactivating the security policy for the traffic flow; and
in response to deactivating the security policy for the traffic flow, decrypting one or more subsequent traffic flows.

2. The method of claim 1, wherein selectively decrypting the traffic flow includes randomly or periodically decrypting the traffic flow.

3. The method of claim 1, wherein selectively decrypting the traffic flow includes selectively decrypting the traffic flow based on a machine learning process.

4. The method of claim 1, further comprising:
at the proxy:
if it is determined that the security policy for the traffic flow is active:
using the one or more traffic flow attributes to train a machine learning process for determining whether future traffic flows are potentially malicious.

5. The method of claim 1, further comprising:
at the proxy:
if it is determined that the security policy for the traffic flow is inactive:
monitoring the traffic flow for anomalies to determine whether to selectively decrypt the traffic flow.

6. The method of claim 1, wherein the traffic flow is an outbound traffic flow sent by a client in the network to an entity external to the network.

7. The method of claim 1, wherein the one or more traffic flow attributes include a source port.

8. An apparatus comprising:
a memory that stores whitelist data for a whitelist;
a network interface that enables network communication; and
one or more processors coupled to the memory and the network interface, wherein the one or more processors are configured to:
obtain a traffic flow;
determine whether a security policy in the whitelist for the traffic flow is active; and
if it is determined that the security policy for the traffic flow is active:
selectively decrypt the traffic flow to produce one or more traffic flow attributes;
based on the one or more traffic flow attributes, determine whether the traffic flow is potentially malicious;
in response to determining that the traffic flow is potentially malicious, deactivate the security policy for the traffic flow; and
in response to deactivating the security policy for the traffic flow, decrypt one or more subsequent traffic flows.

9. The apparatus of claim 8, wherein the one or more processors are configured to selectively decrypt the traffic flow by randomly or periodically decrypting the traffic flow.

10. The apparatus of claim 8, wherein the one or more processors are configured to selectively decrypt the traffic flow based on a machine learning process.

11. The apparatus of claim 8, wherein the one or more processors are further configured to:
if it is determined that the security policy for the traffic flow is active:
use the one or more traffic flow attributes to train a machine learning process for determining whether future traffic flows are potentially malicious.

12. The apparatus of claim 8, wherein the one or more processors are further configured to:
if it is determined that the security policy for the traffic flow is inactive:
monitor the traffic flow for anomalies to determine whether to selectively decrypt the traffic flow.

13. The apparatus of claim 8, wherein the traffic flow is an outbound traffic flow sent by a client in a network to an entity external to the network.

14. The apparatus of claim 8, wherein the one or more traffic flow attributes include a source port.

15. One or more non-transitory computer readable storage media encoded with instructions that, when executed by a processor, cause the processor to:
obtain a traffic flow;
determine whether a security policy in a whitelist for the traffic flow is active; and
if it is determined that the security policy for the traffic flow is active:
selectively decrypt the traffic flow to produce one or more traffic flow attributes;
based on the one or more traffic flow attributes, determine whether the traffic flow is potentially malicious;
in response to determining that the traffic flow is potentially malicious, deactivate the security policy for the traffic flow; and
in response to deactivating the security policy for the traffic flow, decrypt one or more subsequent traffic flows.

16. The one or more non-transitory computer readable storage media of claim 15, wherein the instructions that cause the processor to selectively decrypt the traffic flow include instructions that cause the processor to randomly or periodically decrypt the traffic flow.

17. The one or more non-transitory computer readable storage media of claim 15, wherein the instructions that cause the processor to selectively decrypt the traffic flow include instructions that cause the processor to selectively decrypt the traffic flow based on a machine learning process.

18. The one or more non-transitory computer readable storage media of claim 15, wherein the instructions further cause the processor to:
   if it is determined that the security policy for the traffic flow is active:
      use the one or more traffic flow attributes to train a machine learning process for determining whether future traffic flows are potentially malicious.

19. The one or more non-transitory computer readable storage media of claim 15, wherein the instructions further cause the processor to:
   if it is determined that the security policy for the traffic flow is inactive:
      monitor the traffic flow for anomalies to determine whether to selectively decrypt the traffic flow.

20. The one or more non-transitory computer readable storage media of claim 15, wherein the traffic flow is an outbound traffic flow sent by a client in a network to an entity external to the network.

\* \* \* \* \*